Figure 1:
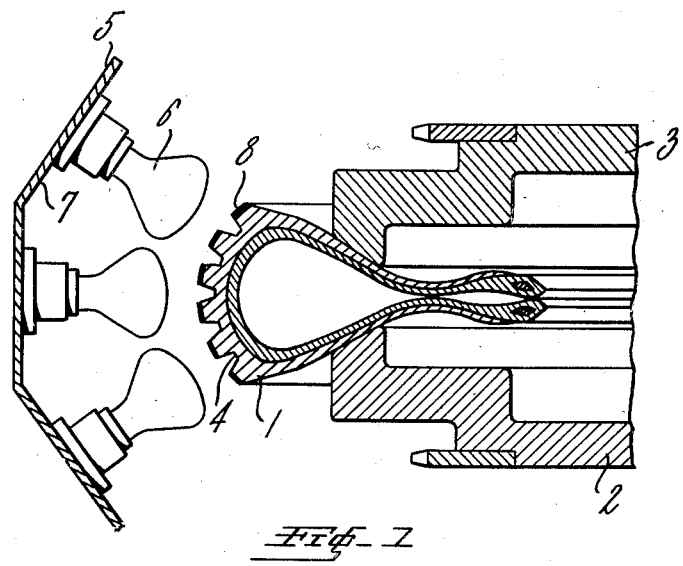

March 20, 1951 W. F. R. BRISCOE ET AL 2,546,085
METHOD OF TREATING TIRES
Filed Dec. 30, 1948

INVENTORS
WILLIAM F.R. BRISCOE
ROBERT B. PLUMMER
BY Henry P. Truesdell
ATTORNEY

Patented Mar. 20, 1951

2,546,085

UNITED STATES PATENT OFFICE 2,546,085

METHOD OF TREATING TIRES

William F. R. Briscoe and Robert B. Plummer, Detroit, Mich., assignors to United States Rubber Company, New York, N. Y., a corporation of New Jersey Application December 30, 1948, Serial No. 68,354

7 Claims. (Cl. 18—48)

Our invention relates to a method of treating rubber articles and more particularly to a new and improved process for treating vulcanized pneumatic tires to improve their flexing qualities and resistance to cracking.

It has been found that pneumatic tires have a tendency to crack at the base of the grooves defining the anti-skid configurations in the tread surface due to the fact that as the inflated tire rolls along the road the rubber in the tread is progressively bent or flexed as it meets the surface of the road. It is the repeated flexing of the tire from a normal curvature to a flat shape where it actually meets the road which produces a certain amount of tension in the tread as the tire springs back to shape and which it is thought makes the tire susceptible to cracking in the tread grooves. This difficulty has been overcome by heat treating the tread grooves in the manner described in Patent No. 2,110,224, issued on March 8, 1938, to Glenn G. Havens and assigned to the same assignee as the instant application. In such treatment, heat is applied to the tread groove while the tread is stretched so that the rubber is released of tension strains; thereafter, the rubber is cooled and allowed to return to its original state so that the rubber at the base of the groove is placed in compression as the tire tread is returned to an unstretched condition. Inasmuch as the rubber at the base of the tread grooves of the tire is now normally in a state of compression, flexure of the tire tread during use will not place the rubber of the grooves under tension but will simply return it to a normal condition without strains. This greatly increases the life of the tire and prevents groove cracking.

Heretofore, such heat treatment has been applied to the tread surface of the tire by means of jets of steam directed against the tread grooves. Although very effective, such steam jets are difficult to use with a tire in which the tread pattern is other than in a straight line. Moreover, a certain amount of time is taken in raising the rubber to the required temperatures so that the total time of heat treatment is excessive. These deficiencies have been overcome by our new and improved method in which radiant heat is applied to the grooved portions of the tread design while at the same time the flat surface of the tread is protected from any damage due to the effect of the heat treatment.

Therefore it is an object of our invention to provide a new and improved method of treating rubber articles, for example, pneumatic tires, by means of radiant heat to render the vulcanized rubber of the article more resistant to cracking.

Figure 2:
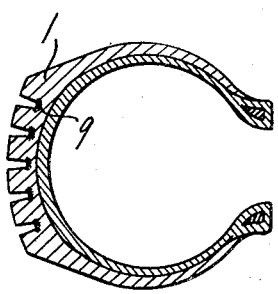

In the accompanying drawing:

Fig. 1 illustrates one form of a suitable apparatus for carrying out our method; and Fig. 2 is a cross-sectional view of a pneumatic tire after having been treated in accordance with the method of the invention.

In practicing the method of our invention, a vulcanized rubber article, provided with indented portions or grooves subject to cracking on flexure, is exposed to radiant heat which acts on the rubber at the bottoms of the indentations to cause the rubber to become soft or plastic. This relieves any strain existing in the rubber which may naturally occur there or which may be placed in the rubber by stretching or expanding the article during the heating cycle. At the same time, the entire surface of the article, with the exception of the bottoms of the grooves or indentations, is protected from any damaging effects of the radiant heat by coating the article with a heat protective covering or paint. As soon as the rubber has softened to an extent sufficient to remove the strains existing in it, the article is allowed to cool so that when returned to its normal condition the rubber at the bottoms of the indentations will be relieved permanently of all strains and in most instances will be placed in a state of compression.

In applying our method of heat treatment to the grooves in the tread portions of pneumatic tire casings, the tread portion is stretched or deformed to expose the bottoms of the tread grooves to the source of heat and to place the rubber at such locations in a state of tension. As shown in Fig. 1 of the drawing, a pneumatic tire casing 1 is placed between the opposed rings 2 and 3 which are then moved toward each other to compress the casing in cross-section so that the tread portion is stretched or deformed to place the rubber therein under tension. The apparatus for clamping and distorting the tire casing itself forms no part of the present invention; it may comprise a construction such as shown by Patent No. 2,314,726, issued March 23, 1943, to O. B. Moore et al. The effect of distorting or stretching the tire casing is to place the rubber at the bottoms 4 of the tread grooves under tension, or other distorting strains, to substantially the same extent as occurs when the tread portion leaves contact with the road in use of the tire.

The distorted tread of the tire casing is now exposed to a source of radiant heat. In one suitable apparatus, a circular supporting frame 5 extends entirely around the circumference of the tire and the supporting rings 2 and 3, although only a portion of the frame is shown in cross-section by Fig. 1. It carries a plurality of infrared heating lamps 6 which are arranged in rows along the supporting frame and which are mounted adjacent each other in closely packed relationship. In order to provide a uniform intensity of heat over the curved surface of the tire tread, the two outer rows of lamps are supported on the inwardly extending surfaces 7 of the frame so that these lamps are spaced from the tire tread a distance equal to the spacing of the inner row of lamps. For commercial sizes of pneumatic tire casings a sufficient amount of heat is obtained by making the focal length of each lamp five inches, as measured from the face of the lamp to the surface of the tire tread; in such instances each lamp is rated at 375 watts. Manifestly, the rating and spacing of the lamps may be varied somewhat depending upon the intensity of heat desired, the area of the tire tread and the length of time during which it is desired to heat the tread rubber.

In order not to heat and soften the road contacting portions of the tread and thereby reduce the wearing qualities of the tire, the radiant heat should be localized or confined to the regions which are to be softened for relieving the strains therein. To this end, the tread surface of the tire, with the exception of the grooves 4, is coated with a heat protective substance 8 as indicated in Fig. 1. One such suitable coating is a water soluble aluminum paint containing 25% aluminum powder suspended in 75% solvent, the solvent comprising 20% poly-vinyl alcohol and 80% water. The aluminum paint serves to reflect the heat. Another suitable protecting coating may be made by mixing bentonite clay, water and fibered asbestoss to spreading consistency and then applying it to the surface of the tire tread. The coatings may be applied to the surface of the tread by means of a transfer roll on which the tire rotates or they may be brushed directly on the tread by hand. The protective coatings may be applied either prior to or subsequent to distortion of the tire casing. It is desirable to provide a heat protective coating which may be easily removed after the heat treating operation to restore the tire tread to its original appearance. Both of the coatings indicated above may be easiy removed from the tread by washing in water. If appearance is not a consideration, it should be manifest that other and more permanent types of heat reflecting coatings may be used such as high temperature reflective paints.

For effective treatment, the rubber in the tread grooves should be held at temperatures of from 400° F. to 550° F. during a period of from one to three minutes. Correct operating temperatures and the length of time required may be determined initially by placing a thermocouple .003" beneath the surface of the tread rubber. The effectiveness of the heat protective coating on the surface of the tread is such that the temperature of the tread is maintained below 250° F. so that there is no adverse affect upon the characteristics of the tread rubber to impair the wearing qualities of the tire. In order to distribute heat more evenly over the surfaces of the tread grooves, the tire casing may be rotated or oscillated back and forth about a vertical axis by a corresponding movement of the clamping rings 2 and 3. A suitable apparatus for accomplishing this result is disclosed in the aforementioned Moore et al. Patent No. 2,314,726.

After the heating cycle has been completed, the tire is cooled to set the rubber at the bottom of the grooves. The tread may be air cooled but in production it is desirable to speed up the cooling process. To this end, the tread groves may be cooled by means of a spray of water directed at the grooves through a series of nozzles. A suitable apparatus for such a spraying operation is likewise disclosed in the Moore et al. Patent No. 2,314,726. After cooling, the rings 2 and 3 are separated to permit the tire casing to assume its normal shape. In doing so, the rubber at the bases of the tread grooves is placed slightly in compression, as indicated at 9 in Fig. 2 of the drawing. This means that when the tire is flexed during operation on the road any tensional strain placed on the rubber at the bottom of the tread grooves will simply tend to neutralize the compressive strain placed in the rubber in the manner indicated. Any tendency for the tread rubber to crack along the lines of the tread grooves is thereby overcome.

The improved method of our invention employs equipment which is easily installed and maintained. The black rubber of the tire tread has a very high coefficient of heat absorption so that the rubber in the tread heats up quickly. Instead of distorting the tread surface for heat treatment by means of the rings 2 and 3 it is possible to distort the tire casing by overinflation. Such a procedure is particularly suitable for tire casings having high stretch cords, such as nylon, which prevent any permanent deformation of the casing but permit a groove extension due to overinflation. For example, a passenger car tire casing normally operated at 30 pounds per square inch air pressure, and constructed with nylon cords, may be temporarily inflated to 60 or more pounds pressure for heat treatment. Thereafter, on completion of the heating process, the casing will return to normal condition and size upon release of the pressure.

An outstanding advantage of our improved method is its suitability for use with tires in which the tread grooves are of irregular configuration such that they do not extend in straight lines around the periphery of the tire. When steam jets are used they are necessarily directed in a straight line along the groove and cannot follow a tortuous path back and forth across the surface of the tire. On the other hand, the radiant heat is applied evenly over the entire surface of the tire tread and easily penetrates into the grooves irrespective of their particular design or arrangement on the tire casing.

Having thus described our invention, what we claim and desire to protect by Letters Patent is:

1. The method of treating a vulcanized rubber tire having a grooved design in the tread surface, the rubber in the bottoms of the grooves being in a strained condition, which includes coating the surface of the tread adjacent the grooves with a heat reflecting material, applying radiant heat to the tread surface to release the strains in the rubber at the bottoms of the grooves and thereafter removing the heat reflecting coating.

2. The method of treating a vulcanized rubber tire having a grooved design in the tread surface, the rubber in the bottoms of the grooves being in a strained condition, which includes applying a heat protective coating to the surface of the tread adjacent the grooves and applying radiant heat to the tread surface to release the strains in the rubber at the bottoms of the grooves.

3. In a method of treating a vulcanized rubber tire having a grooved tread design on its outer surface the steps which include applying a heat protective coating to the surface of the tread adjacent the grooves, deforming the tire to produce strains in the rubber in the bottom walls of the grooves, and applying radiant heat to the tread surface to release the strains in the rubber.

4. In a method of treating a vulcanized rubber tire having a grooved tread design on its outer surface the steps which include applying a water-soluble, heat protective coating to a portion of the tread surface adjacent the grooves, deforming the tire to stretch the rubber at the bottoms of the tread grooves, applying radiant heat to the tread surface during stretching of the rubber to soften the rubber at the bottoms of the grooves, and releasing the tire to place the rubber at the bottoms of the grooves under compression.

5. In a method of treating a vulcanized rubber tire having a grooved tread design on its outer surface the steps which include applying a heat reflective coating to a portion of the tread surface adjacent the grooves, deforming the tire to stretch the rubber at the bottoms of the tread grooves, applying radiant heat to the tread surface during stretching of the rubber to soften the rubber at the bottoms of the grooves, permitting the softened rubber to cool to its original state of reisiliency and releasing the stretched rubber so that the rubber at the bottoms of the tread grooves is placed under compression.

6. In a method of treating a vulcanized rubber tire having a grooved tread design on its outer surface, the steps which include applying a heat reflective coating to a portion of the tread surface adjacent the grooves, stretching the rubber transversely at the bottoms of the grooves, applying radiant heat to the tread surface during stretching of the rubber to soften the rubber at the bottoms of the grooves, cooling the softened rubber to permit it to reset to its original state of resiliency and releasing the stretched rubber so that the rubber at the bottoms of the tread grooves is placed under compression.

7. In a method of treating a vulcanized rubber mass having indented portions subject to cracking on flexure, the steps which include applying a heat reflecting coating to the rubber mass adjacent the indented portions, deforming the mass to stretch the rubber at the bottoms of the indentations, applying radiant heat to the surface of the mass during stretching of the rubber to soften the rubber at the bottoms of the indentations, cooling the softened rubber to permit it to return to its original state of resiliency and releasing the stretched rubber so that the rubber at the bottoms of the indentations is placed under compression.

WILLIAM F. R. BRISCOE.
ROBERT B. PLUMMER.

REFERENCES CITED

The following references are of record in the file of this patent:

UNITED STATES PATENTS

| Number | Name | Date |
|---|---|---|
| 2,110,224 | Havens | Mar. 8, 1938 |
| 2,402,631 | Hull | June 25, 1940 |